(12) United States Patent
Smith et al.

(10) Patent No.: US 6,701,388 B1
(45) Date of Patent: Mar. 2, 2004

(54) APPARATUS AND METHOD FOR THE EXCHANGE OF SIGNAL GROUPS BETWEEN A PLURALITY OF COMPONENTS IN A DIGITAL SIGNAL PROCESSOR HAVING A DIRECT MEMORY ACCESS CONTROLLER

(75) Inventors: Patrick J. Smith, Houston, TX (US); Jason A. Jones, Houston, TX (US); Kevin A. McGonagle, Houston, TX (US); Tai H. Nguyen, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 464 days.

(21) Appl. No.: 09/670,666

(22) Filed: Sep. 27, 2000

Related U.S. Application Data

(60) Provisional application No. 60/156,626, filed on Sep. 28, 1999.

(51) Int. Cl.[7] .............................................. G06F 13/28
(52) U.S. Cl. ............................ 710/22; 710/33; 710/48
(58) Field of Search ............................. 710/22, 33, 48

(56) References Cited

U.S. PATENT DOCUMENTS

| | | | | |
|---|---|---|---|---|
| 5,053,779 A | * | 10/1991 | Dewhirst | 342/195 |
| 5,619,720 A | * | 4/1997 | Garde et al. | 712/38 |
| 5,628,026 A | * | 5/1997 | Baron et al. | 710/1 |
| 5,675,751 A | * | 10/1997 | Baker et al. | 710/305 |
| 5,812,876 A | * | 9/1998 | Welker et al. | 710/22 |
| 5,911,082 A | * | 6/1999 | Monroe et al. | 712/35 |
| 6,126,601 A | * | 10/2000 | Gilling | 600/440 |
| 6,275,877 B1 | * | 8/2001 | Duda | 710/23 |
| 6,456,628 B1 | * | 9/2002 | Greim et al. | 370/466 |

* cited by examiner

*Primary Examiner*—Kim Huynh
*Assistant Examiner*—Eron Sorrell

(57) ABSTRACT

As the digital signal processor has become more flexible, the direct memory access controller has assumed greater computational power to permit the core processing unit to perform its specialized processing without responding to signal transfer requests. Not only does the direct memory access controller control the exchange of signal groups between the memory unit and the core processing unit, but the direct memory access controller is also responsible for the transfer of signal groups within the digital signal processor that originate from the serial port, and the interface unit (the unit that implements the direct transfer of signal groups from the memory unit of one digital signal processor to a second signal processor). The direct memory access controller has programmable channels that permit the signal group source component to be coupled to the signal group destination component. The address unit of the direct memory access unit must be able to accommodate a plurality of addressing modes. An arbitration unit prevents conflict between the components. With respect to the host port interface unit, the exchange of the signal groups with the memory unit as performed by a direct transfer, the direct memory access controller preventing conflicting signal groups transfers.

18 Claims, 3 Drawing Sheets

APPARATUS AND METHOD FOR THE EXCHANGE OF SIGNAL GROUPS BETWEEN A PLURALITY OF COMPONENTS IN A DIGITAL SIGNAL PROCESSOR HAVING A DIRECT MEMORY ACCESS CONTROLLER

This application claims the benefit of U.S. Provisional Application No. 60/156,626, filed Sep. 28, 1999.

RELATED APPLICATIONS

U.S. patent application Ser. No. 09/670,663; APPARATUS AND METHOD FOR THE TRANSFER OF SIGNAL GROUPS BETWEEN DIGITAL SIGNAL PROCESSORS IN A DIGITAL SIGNAL PROCESSING UNIT; invented by Patrick J. Smith, Jason A. Jones and Kevin A. McGonagle; filed on even date herewith; and assigned to the assignee of the present application: U.S. patent application Ser. No. 09/670,664: APPARATUS AND METHOD FOR ACTIVATION OF A DIGITAL SIGNAL PROCESSOR IN AN IDLE MODE FOR INTERPROCESSOR TRANSFER OF SIGNALGROUPS IN A DIGITAL SIGNAL PROCESSING UNIT; invented by Patrick J. Smith, Jason A. Jones, and Kevin A. McGonagle; filed on even date herewith; and assigned to the assignee of the present application: U.S. patent application Ser. No. 09/670,665; APPARATUS AND METHOD FOR A HOST PORT INTERFACE UNIT IN A DIGITALSIGNAL PROCESSING UNIT; invented by Patrick J. Smith, and Jason A. Jones; filed on even date herewith; and assigned to the assignee of the present invention: U.S. patent application Ser. No. 09/670,667; APPARATUS AND METHOD FOR A SORTING MODE IN A DIRECT MEMORY ACCESS CONTROLLER OF A DIGITAL SIGNAL PROCESSOR; invented by Patrick J. Smith and Tai H. Nguyen; filed on even date herewith; and assigned to the assignee of the present application: and U.S. patent application Ser. No. 09/670,668; APPARATUS AND METHOD FOR ADDRESS MODIFICATION IN A DIRECT MEMORY ACCESS CONTROLLER; invented by Patrick J. Smith; filed on even date herewith; and assigned to the assignee of the present application are related applications.

BACKGROUND OF THE INVENTION

1. Field of the Invention

This invention relates generally to the data processing apparatus and, more particularly, to the specialized high performance processor units generally referred to as digital signal processing units. The invention relates to the transfer of signal groups between the various components of the digital signal processor.

2. Background of the Invention

Digital signal processing units have been developed as specialized data processing units. These units are optimized to perform routine, albeit complex, operations with great efficiency. For many applications, the computations need to done in as close to real time as possible. In order to achieve the computational speed required of the digital signal, the digital signal processing units are optimized to perform the specified processing operation(s) with great efficiency. In addition, many of the functions that would be performed by a general purpose processing unit are eliminated or the funtionality performed outside of the core processing unit.

Referring to FIG. 1, a digital signal processing unit 1, according to the prior art, is shown. A first digital signal processor 10 includes a core processing unit 12 (frequently referred to as a processing core), a direct memory access unit 14, a memory unit or memory units 16, and a serial port or serial ports 18. The memory unit 16 stores the signal groups that are to be processed or that assist in the processing of the signal groups to be processed by the core processing unit 12. The core processing unit 12 performs the bulk of the processing of signal groups in the memory unit 12. The direct memory access unit 14 is coupled to the core processing unit 12 and to memory unit 16 and mediates the signal group exchange therebetween. The serial port 18 exchanges signal groups with components external to the digital signal processing unit 1. The core processing unit 12 is coupled to the serial port 18 and to the memory unit 16 and controls the exchange of signal groups between these components.

The digital signal processor is typically designed and implemented to have limited functionality, but functions that must be repeated and performed rapidly. The fast Fourier transform (FFT) calculation and the Viterbi algorithm decoding are two examples where digital signal processors have been utilized with great advantage. To insure that the digital signal processors operate with high efficiency, the core processing is generally optimized for the performance of limited processing functions. Part of the optimization process involves the off-loading, to the extent possible, any processing not directed toward the optimized function. The exchange of signal groups involving the core processing unit and the memory unit has been assigned to the direct memory access unit.

The digital signal processor has assumed greater processing responsibilities. Not only does the need for speed remain undiminished, but a simultaneously, the requirements to exchange signal groups with a wider variety of external apparatus have arisen. For example, in a digital signal processing unit having multiple digital, signal processors, it is frequently necessary to communicate between the digital signal processors that are part of the same digital signal processing unit. While this communication can be performed through the serial port, this mode of operation has proven cumbersome and slow. Similarly, a host microcontroller requiring the exchange signal groups with the digital signal processor can similarly use the serial port to communicate with a digital signal processor at the expense of operational efficiency. In addition, the addressing modes that are implemented both in the memory unit (e.g., the circular buffer mode) and in the serial port (e.g., the sorting mode) have become increasingly complex. All of this increasing computational complexity has the potential to undermine the performance of the microcontroller.

A need has therefore been felt for apparatus and an associated method having the feature that the transfer of signal groups between components of a digital signal processor is accomplished without the active participation of, but under the control of the core processing unit. It would be another feature of the apparatus and method to place the control of the transfer of signal groups in the digital signal processor in the direct memory access controller. It would be still another feature of the apparatus and associated method to have flexibility in coupling the source and destination components involved in the transfer of signal groups. It would be yet another feature of the apparatus and associated method to prioritize and to prevent conflicts in the transfer of signal groups within the digital signal processing unit. It would be still further feature of the apparatus and associated method to permit the transfer of signal groups with components external to the digital signal processor. It would still another feature of the apparatus and associated method to provide flexibility in the addressing modes available to the direct memory access controller.

SUMMARY OF THE INVENTION

The aforementioned and other features are accomplished, according to the present invention, by a direct memory access controller that has programmable channels, a flexible addressing unit and apparatus for avoiding conflict between requested signal transfers. The direct memory access controller assumes the responsibility for the exchange of data groups between the serial port and the memory unit, thereby relieving the core processing unit of this operational responsibility. In addition, by adding a host port interface unit to the digital signal processor, parallelly formatted signal groups can be exchanged with external components, particularly a microcontroller. A processor to processor interface unit provides for the exchange of signal groups between digital signal processors that are part of the same digital signal processing unit. The direct memory access controller includes context registers available to the core processing unit that provide the core processing unit with over all control of the transfer of signal groups within a digital signal processor. The direct memory access controller includes a plurality of programmable channels that can couple the source component to the destination component. The direct memory access controller includes an arbitration unit so that the requests for access to the channels can be prioritized and conflicts avoided.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENTS

1. Detailed Description of the Figures

Figure 1:
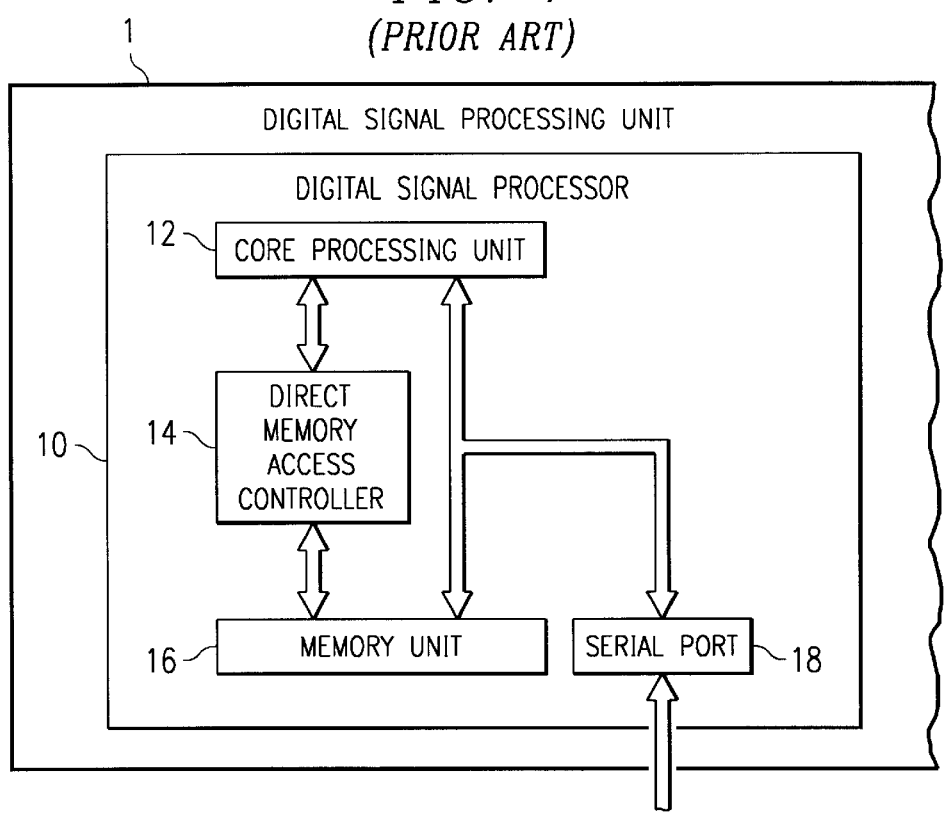
FIG. 1 is a block diagram of a digital signal processing unit having two digital signal processors according to the prior art.

FIG. 1 has been discussed with respect to the to the prior art.

Figure 2:
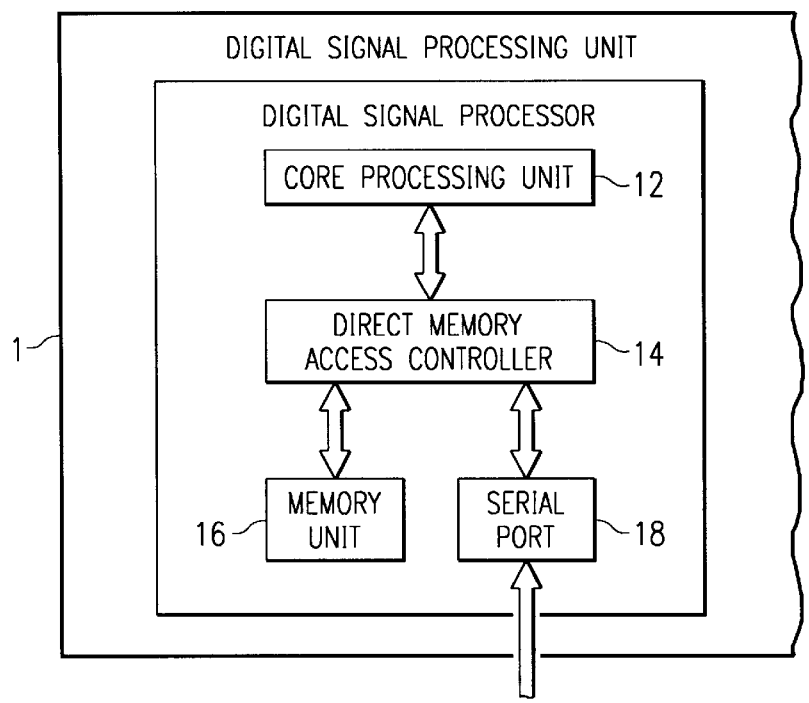
FIG. 2 is a block diagram of a more recent embodiment of a digital signal processing unit.

The first step in relieving processing responsibility is to transfer the responsibility for the exchange of signals between the memory unit and serial port to the direct memory access controller. Referring to FIG. 2, the digital signal processor 20 has a core processing unit 12, a direct memory access controller, a memory unit 16, and a serial port 18, the same components as in the prior art digital signal processors shown in FIG. 1. The difference between the embodiments in FIG. 1 and FIG. 2 is as follows. In FIG. 1, the direct memory access controller 14, control the exchange of signal groups between the memory unit 16, and the core processing unit 12. In FIG. 2, the direct memory access controller 24 controls not only the exchange of signal groups between the memory unit 16, and the core processing unit 12, but also controls the exchange of signal groups between the serial port 18, the host processor interface unit 25, and the processor to processor interface unit 23. With this implementation, the core processing unit 12 is relieved of processing responsibilities for the serial port as shown in FIG. 1, as compared to the implementation shown in FIG. 1. Because of the large number of possible addressing modes, i.e., frame mode, circular buffer mode and sorting mode, this transfer of the responsibilities for controlling the exchange of signal groups between the serial port and the memory unit can be significant.

Figure 3:
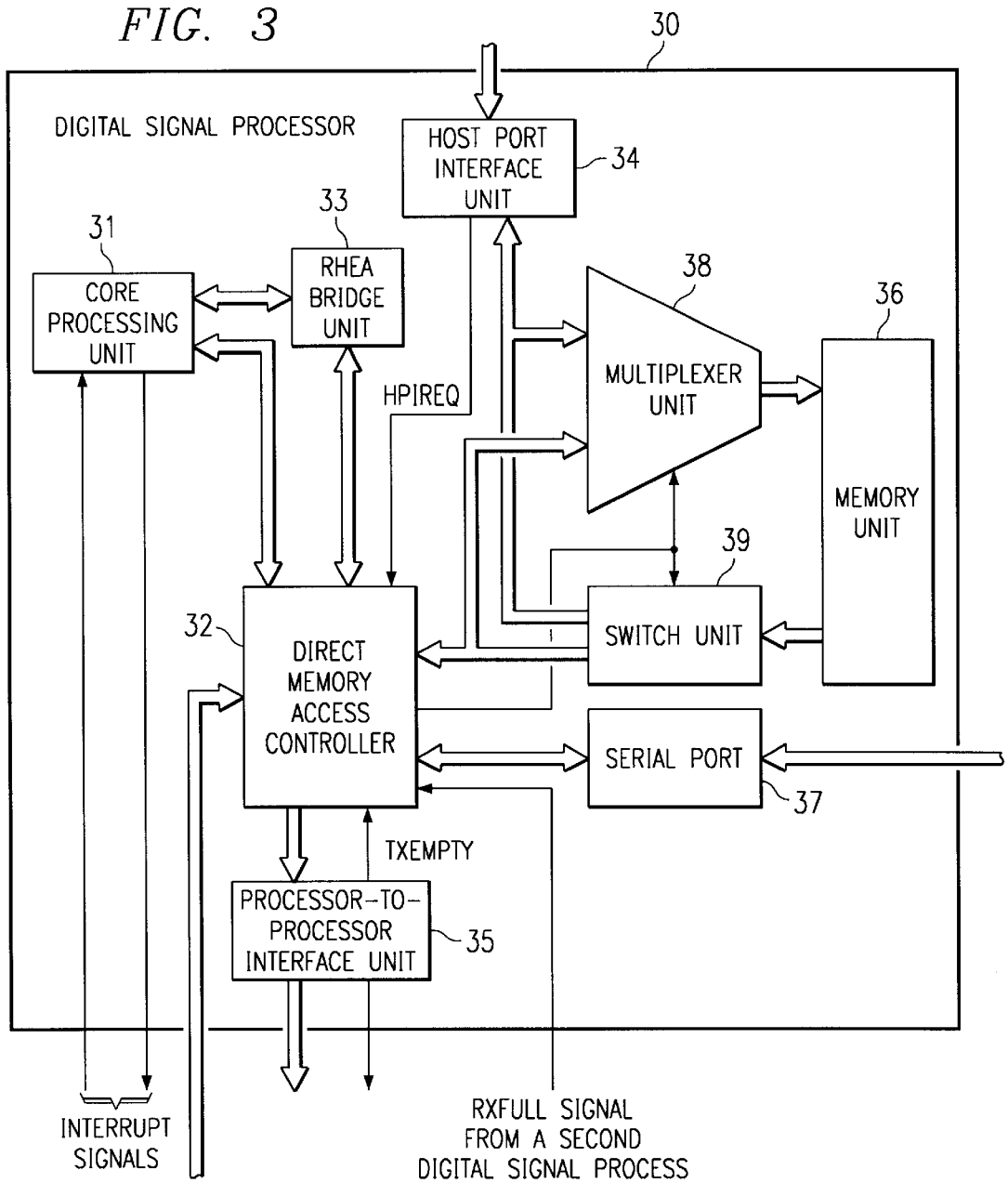
FIG. 3 is a block diagram of a preferred embodiment of a digital signal processor according to the present invention.

Referring next to FIG. 3, a block diagram of a digital signal processor 30, according to the preferred embodiment of the invention, is shown. The core processing unit 31 performs the principal processing functions of digital signal processor 30. The core processing unit 31 is generally optimized in both hardware and in software to perform a limited number of processing functions extremely efficiently. The memory unit 36 stores the signal groups that the core processing unit requires for the processing functions. The serial port 37 exchanges signal groups with components outside of the digital signal processing unit. The rhea bridge unit 33 provides an interface between a memory-mapped register bank in the core processing unit 31 and control (context) registers in the direct memory access controller 32. The host port interface unit 34 exchanges signal groups with external components, typically a microcontroller. The direct memory access controller 36 exchanges signal with the serial port 37. The direct memory access controller 36 applies signal groups to multiplexer 38 and receives signals from switch 37. The host port interface unit 34 applies signals to the multiplexer unit 38 and receives signal groups from the switch unit 39. The switch unit 39 and the multiplexer unit 38 receive control signals from the direct memory access controller 32. The direct memory access controller 32 receives a HPIREQ signal from the host port interface unit 34. The processor to processor interface unit 35 permits the transfer of signal groups between digital signal processors that are fabricated as part of the digital signal processing unit. The processor-to-processor interface unit 35 applies an TXEMPTY signal to the direct memory interface controller 32 in the same digital signal processor as the direct memory access controller 32. In response, the direct memory access controller 32 applies the requested signal groups to the processor-to-processor interface unit 35, the signal groups having been previously stored in the memory unit 36. The processor-to-processor interface unit 35 transmits a RXFULL signal to the direct memory access unit 35' of the digital signal processor that has requested the signal group(s). The direct memory access unit 35 of digital signal processor 30 receives a TXFULL signal from the processor-to-processor interface unit 35' of the other digital signal processor. In response to this TXFULL signal, the signal group stored in the processor-to processor interface unit 35' is transferred through the direct memory access controller 32 to the memory unit 36. The digital signal processor to digital signal processor transfer of signal groups is initiated by an interrupt signal applied by the requesting digital signal processing unit to the core processing unit of the digital signal, processor storing the requested signal group.

Figure 4:
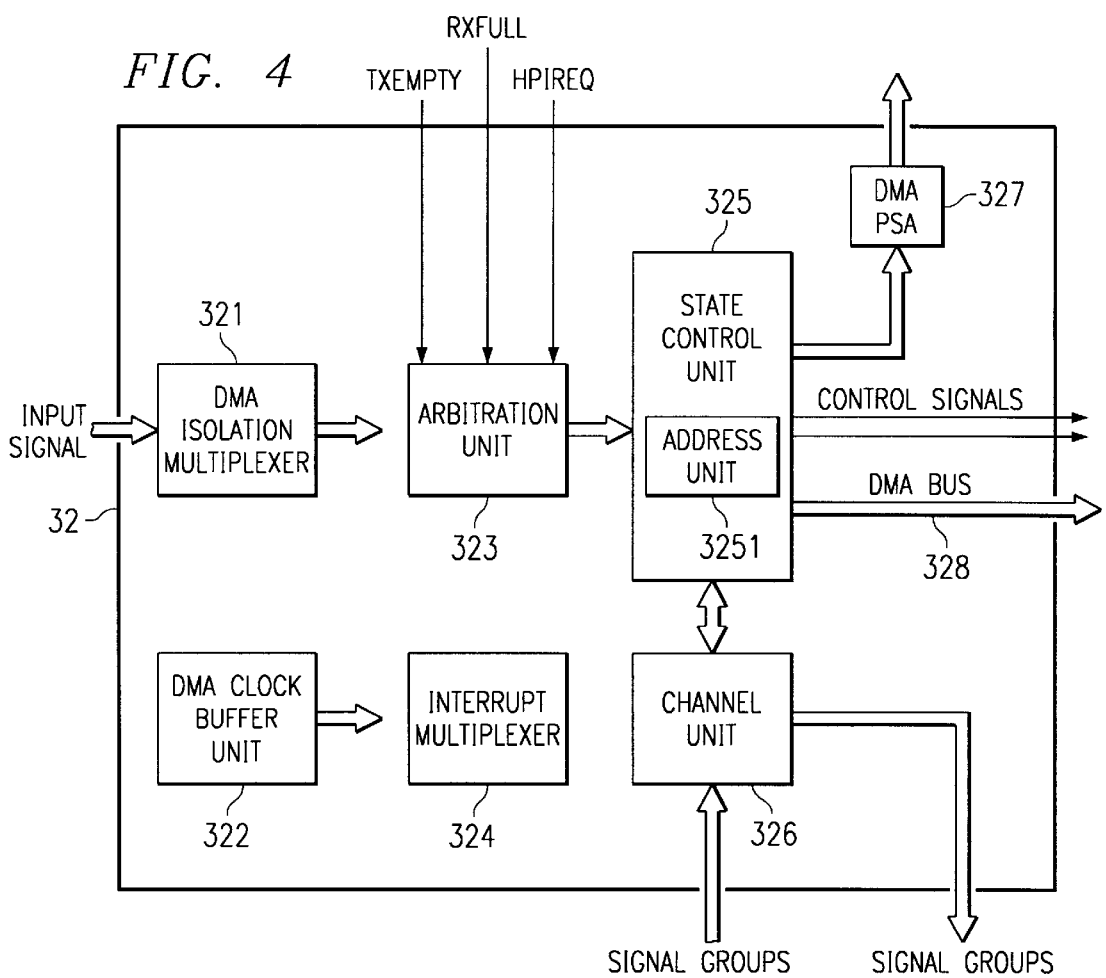
FIG. 4 is a block diagram of a direct memory access controller capable of advantageously using the present invention.

Referring to FIG. 4, a block diagram of a direct memory access controller 32 according to the preferred embodiment of the present invention is shown. The direct memory access controller 32 includes dma isolation multiplexer 321, a clock buffer unit 322, an arbitration unit 323, an interrupt multiplex unit 324, a state control unit 325, and a psa unit 326. The dma isolation multiplexer 321 includes the logic components to isolate the input signals to the direct memory access controller 32 and is used for testing purposes. The clock buffer unit 322 contains logic to correct for the skew of the external (i.e. to the digital signal processor) clock signal. The clock signal is then distributed throughout the direct memory access unit 32. The interrupt multiplexer unit 324 provides synchronous interrupts to the core processing unit of the digital signal processor 30. The arbitration unit 323 includes apparatus responsive to bids for control of one of the channels to select user of the channel. The psa unit 326 is a calculator for testing and for debugging the direct memory access unit 32. The state control unit 325 selects the state (configuration) of the direct memory access controller and applies the control signals that implement the machine configuration. The state control unit 325 receives signals from the arbitration unit 323 that determines the state of the direct memory access controller 323 during the transfer of signal groups. The arbitration unit receives the TXEMPTY signal the RXFULL signal and the HPIREQ signal. These signals are compared with competing requests for control for transfer of the signal groups through the direct memory access controller 32 according to a preselected priority list and the results communicated to the state control unit for appropriate generation of control signals. Referring to the channel 326, the transferred signal groups are shown as separate from the dma bus. This separation is shown in order to explain the operation of the channel unit 326. The dma bus 328 carries not only control signal groups and address signal groups, but also the signal groups that are being exchanged between components of the digital signal processing unit 30.

Figure 5:
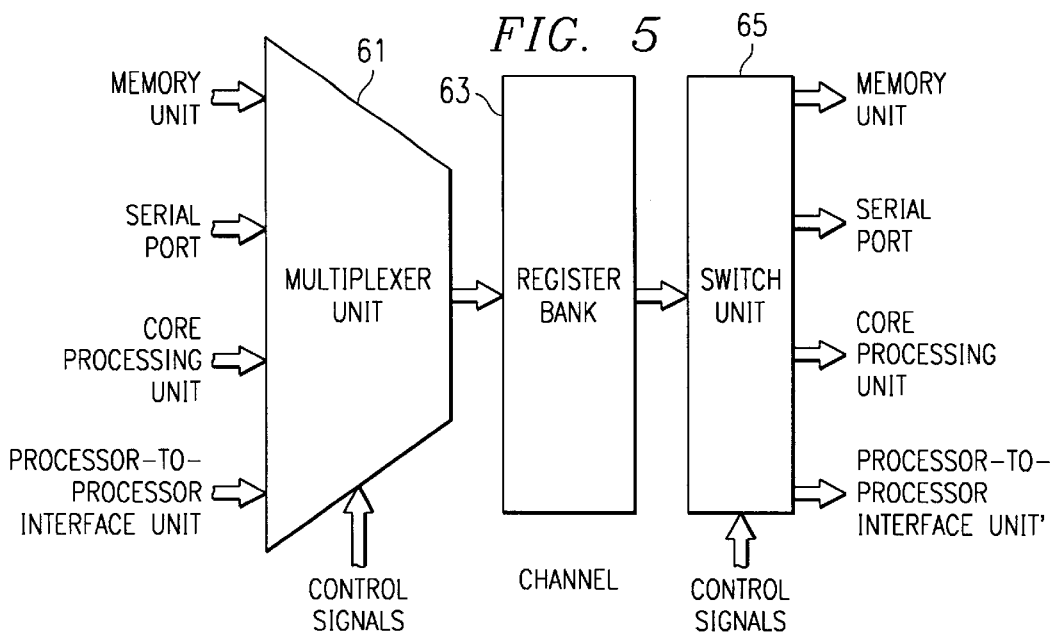
FIG. 5 illustrates the operation of the channels according to the present invention.

Referring to FIG. 5, the operation of the channel units 349 of the direct memory access unit is illustrated. The channel units 349 includes a plurality of channels of which one is channel is shown in FIG. 6. Multiplexer 61 have coupled to input terminals thereof all of the source components of signal groups. As shown in the FIG. 6. the source components include the memory unit 16, the serial port 18, the core processing unit 12, and the processor-to-processor interface unit 31'. Note that the input terminals are coupled to direct memory access unit 34' of the second digital signal processor 30'. Control signals from the dma bus 347 select the source component to be transmitted through multiplexer unit 61. The signal groups transmitted through the multiplexer unit 61 are applied to and stored in the register bank 63. The signal group stored in the register bank 63 is applied to the switch unit 65. Switch unit 65, in response to control signals from the dma bus 349, transmits the signal group and applies the signal group to one of the possible destination components, i.e., the memory unit 16, the serial port 18, the core processing unit 12 and to the interface unit 31 associated with the digital signal processor 30 in which the channel units 349 are located. In the preferred embodiment, although six programmable channels are only is active at any time. With respect to the host port interface unit 34, the signal groups are exchanged directly with the memory unit and are not transmitted through the channel unit 324.

2. Operation of the Preferred Embodiments

As indicated previously, the direct memory access as assumed increased responsibility for the transfer of signal groups. While the core processing unit has the ultimate control of the transfer of the signal groups, the routine activity of the signal group transfer has been placed in the direct memory access controller. Originally, the direct memory access controller provided the interface between the core processing unit and the memory unit. In the preferred embodiment of the present invention, the direct memory access unit controller controls or is involved in nearly every signal group transfer. With respect to the exchange of signals between the serial port and the memory unit, addressing modes must be made available. These addressing modes, i.e., the frame mode, the circular buffer mode and the sorting mode, and the apparatus for implementing these addressing modes is described in the co-pending U.S. Patent Application entitled APPARATUS AND METHOD FOR ADDRESS MODIFICATION IN A DIRECT MEMORY ACCESS CONTROLLER, cited above. With respect to the host port interface unit, the channels in the direct memory access controller are not directly involved in the signal group transfer. However, the direct memory access controller provides the control signals to insure that the transfer of signal groups between host port processor and the memory unit do not conflict with other signal groups transfers in the digital signal processor. With respect to the processor-to-processor signal group transfers, these transfers are in fact implemented using the channel unit for the actual transfer. In all transfers, the arbitration unit is involved to the extent that the signal transfer with the highest priority is processed first. In one application of the present invention, the digital signal processing unit can operate under the overall control of a microcontroller. It is therefore important that communication with the microcontroller takes precedence over the other signal group transfers.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A digital signal processing unit, the digital signal processing unit comprising:

a digital signal processor, the digital signal processing unit including:

a core processing unit, the core processing unit processing signal groups applied thereto;

a memory unit for storing signal groups;

a serial port for exchanging signal groups with components external to the digital signal processing unit;

a host port interface unit for receiving signal groups from an external microcontroller;

a processor-to-processor interface unit for exchanging signal groups with an external data signal processing unit; and a direct memory access controller, the direct memory access controller controlling exchange of signal groups between the memory unit and the core processing unit, the direct memory access controller controlling the exchange of signal groups there through between the serial port, processor-to-processor interface unit and the host port processing unit and the memory unit, the direct memory access controller preventing a conflict with other signal transfers during the exchange of signal groups directly between the memory unit and the host port interface unit.

2. The digital signal processing unit as recited in claim 1 further comprising a second digital signal processor, the digital signal processor and the second digital signal processor including:

apparatus for the transfer of signal groups between the memory units of the digital signal processor and the second digital signal processor, wherein the direct memory access controllers of the digital signal processor and the second digital signal processor control the transfer of signal groups.

3. The digital signal processing unit as recited in claim 1 wherein the direct memory access controller includes an address unit, the address unit having a frame mode, a circular buffer mode and a sorting mode.

4. The digital signal processing unit as recited in claim 1 wherein the direct memory access controller has a plurality of channels for implementing the transfer of signal groups between the components of the digital signal processor.

5. The digital signal processing unit as recited in claim 1 wherein the direct memory access controller has an arbitration unit, the arbitration unit resolving conflicts in requests for signal group transfer.

6. The digital signal processor as recited in claim 1 further comprising signal group transfer apparatus, the apparatus including:
   a register unit;
   a switch responsive to the control signals for selectively applying signal groups from the register unit to the processor-to-processor interface unit, the serial port, the core processor and to the memory unit; and
   a multiplexer responsive to the control signals for selectively applying signal groups from the memory unit, the serial port, the core processing unit, and the processor-to-processor to the register unit.

7. In a digital signal processing unit, the method of transferring signal groups, the method comprising:
   providing the digital signal processor of the digital signal processing unit with a direct memory access controller, the direct memory access controller having a plurality of channels therein, each channel capable of intercoupling two digital signal processor components selected from the group consisting of a core processing unit, a memory unit, a processor-to-processor interface unit, and a serial port in response to control signals, the direct management unit coupling a host port processor directly to the memory unit in response to control signals;
   applying signals to an arbitration unit requesting access to a channel coupling two selected components,
   when the signal group transfer between two selected components has a higher priority than other pending requests, generating control signals coupling the two selected components; and
   transferring signal groups between the two selected components.

8. The method as recited in claim 7 wherein the digital signal processing unit comprises two digital signal processors, each digital signal processor having a processor-to-processor interface unit for transferring signal groups from the memory unit of a first digital signal processor to the memory unit of a second digital signal processing unit, the interface unit of the first digital signal processor and the interface unit of the second digital signal processor being coupled to the direct memory access controller of the other digital signal processor.

9. The method as recited in claim 7 wherein the transferring step includes generating at least one of a source address and a destination address associated with the signal group being transferred through the channel.

10. The method as recited in claim 9 wherein the generating an address includes generating an address in a mode selected from the group consisting of a frame address mode, a circular buffer address mode and a sorting address mode.

11. The method as recited in claim 7 further comprising implementing the plurality of channels with
   a register unit;
   a switch responsive to the control signals for selectively applying signal groups from the register unit to the processor-to-processor interface unit, the serial port, the core processor and to the memory unit; and
   a multiplexer responsive to the control signals for selectively applying signal groups from the memory unit, the serial port, the core processing unit, and the processor-to-processor to the register unit.

12. In a digital signal processor in a digital signal processing unit, the digital signal processor having a core processing unit, a serial port, a memory unit, a processor-to-processor interface unit and a host port interface unit, a direct memory access controller comprising:
   a plurality of channels, each channel transferring signals there throughout between a selected two of the core processing unit, processor-to processor-interface unit, the memory unit, and the serial port in response to control signals;
   an arbitration unit responsive to channel requests for resolving conflicts, the arbitration unit selecting the two units to be coupled;
   a channel directing coupling the memory unit and the host port processing unit in response to control signals; and
   a state control unit, the state control unit responsive to signals from the arbitration unit for generating the control signals.

13. The direct memory access controller as recited in claim 12, wherein the digital signal processing unit has two digital signal processors, each digital signal processor including a processor-to-processor interface unit, the direct memory access controller channel units coupling to the interface unit in the digital signal processor unit in which the direct memory access controller is located and to the interface unit in the other digital signal processor in response to control signals.

14. The direct memory access controller as recited in claim 12 further comprising an address unit for generating at least one of a source address and a destination address, the address unit providing addresses in one of a frame mode, a circular buffer mode, and a sorting mode.

15. The direct memory controller as recited in 12 wherein, in response to a request to transfer signal groups between the host port interface unit and the memory unit applied to the arbitration unit, the state control unit generates control signals preventing the direct memory access unit from transferring signal groups.

16. The direct memory access controller as recited in claim 15 wherein a signal group transfer between the host port interface unit and the memory unit has the highest signal transfer priority.

17. The direct memory access controller as recited in 16 wherein the host processor interface unit has signal groups from a microcontroller applied thereto, the microcontroller controlling the processing of the digital signal processor.

18. The digital signal processor as recited in claim 12 wherein the plurality of channels include:
   a register unit;
   a switch responsive to the control signals for selectively applying signal groups from the register unit to the processor-to-processor interface unit, the serial port, the core processor and to the memory unit; and
   a multiplexer responsive to the control signals for selectively applying signal groups from the memory unit, the serial port, the core processing unit, and the processor-to-processor to the register unit.

* * * * *